Aug. 7, 1962 O. H. SCHADE, SR 3,048,654

TELEVISION PROJECTION TUBE ALIGNMENT

Filed May 28, 1959 2 Sheets-Sheet 1

INVENTOR.
OTTO H. SCHADE, Sr.

BY [signature]

ATTORNEY

INVENTOR.
OTTO H. SCHADE, Sr.
BY
W. H. Sprague
ATTORNEY

United States Patent Office 3,048,654
Patented Aug. 7, 1962

3,048,654

TELEVISION PROJECTION TUBE ALIGNMENT

Otto H. Schade, Sr., West Caldwell, N.J., assignor to Radio Corporation of America, a corporation of Delaware Filed May 28, 1959, Ser. No. 816,604
6 Claims. (Cl. 178—7.81)

This invention relates to image projection apparatus and in particular to an improved cathode ray tube assembly which provides accurate registry of a projected image on a target screen.

Various methods and means have been proposed for focusing and deflecting the electron beam of a projection tube, and for aligning the tube with respect to external optical apparatus to provide proper registration of image elements on a target screen. The prior proposed devices generally employ a reference plane and fulcrum external to the tube for supporting the assembly of the tube and deflection yoke. In such event, the required adjustments must be made repetitiously to approach an ideal condition of proper registration, since an adjustment for one condition tends to disturb a previously established relationship. Also when a tube is replaced, it is necessary to make the same adjustments over again in addition to aligning the replacement tube. This type of arrangement usually necessitates a complicated and relatively expensive adjustment mechanism, and involves loss of time during manufacturing assembly and subsequent servicing.

An object of this invention is to provide an improved cathode ray tube assembly including simple means for focusing, centering, and aligning the electron beam.

Another object of this invention is to provide an improved image projection system wherein adjusting means are provided for aligning a plurality of cathode ray tubes so that image information transmitted by such tubes in the form of optical light rays is properly registered on a display screen to provide true representation of an image.

For clarity and simplification of the description, the specification will relate all spatial relationships of the structural components to an "optical axis" which is associated wtih each image projection tube. The "optical axis" for a tube, as used hereinafter, is defined by a straight line which extends through the optical center and through the center of curvature of a principal reflecting lens that is spaced from the faceplate of the projection tube.

In a projection system using a plurality of projection tubes, such as in a three-tube color television receiver for example, it is necessary to satisfy certain basic requirements to obtain a sharply focused, properly aligned and centered image on a display screen. These requirements are as follows:

(1) The center of curvature of the luminescent phosphor screen of each projection tube should lie on the optical axis associated with that tube, and should remain on the optical axis when the tube is adjusted axially for obtaining uniform optical focus.

(2) In order to produce a centered raster display and to minimize deflection distortion, the deflection field axis of each tube should coincide with the optical axis for that tube.

(3) The electron beam focusing lens for each tube, which may be magnetic or electrostatic, should be coaxially aligned with both the optical axis and the deflection yoke axis of the tube to eliminate any electron beam astigmatism.

(4) The electron beam in each tube should pass through the center of the tube's magnetic or electrostatic focusing lens and through the center of curvature of the tube's phosphor screen on the deflection field axis prior to deflection.

According to the invention, a pivotal means is mounted on a projection tube so that the center of curvature of the tube's spherical image reproducing screen and the center of the pivotal means coincide. To correct for electron gun misalignment or the effect of external fields, such as the earth's field, on the electron beam, the tube is tilted or pivoted about these coincident centers to align the tube with respect to the optical elements of an image projection system. Thus image information is transmitted to a display screen so that accurate representation of the image is provided. The tilting correction satisfies the fourth requirement and is accomplished without disturbing previous adjustments made to satisfy the first three requirements described above.

In the specific embodiment of the invention, the pivotal means may be a spherical type or ball shaped sleeve which is mounted between the cylindrical neck of the tube and a surrounding deflection yoke that is fixed in a substantially coaxial relation to the optical axis of the tube.

The invention is described in greater detail with reference to the accompanying drawings in which.

Figures 1, 3, 4:
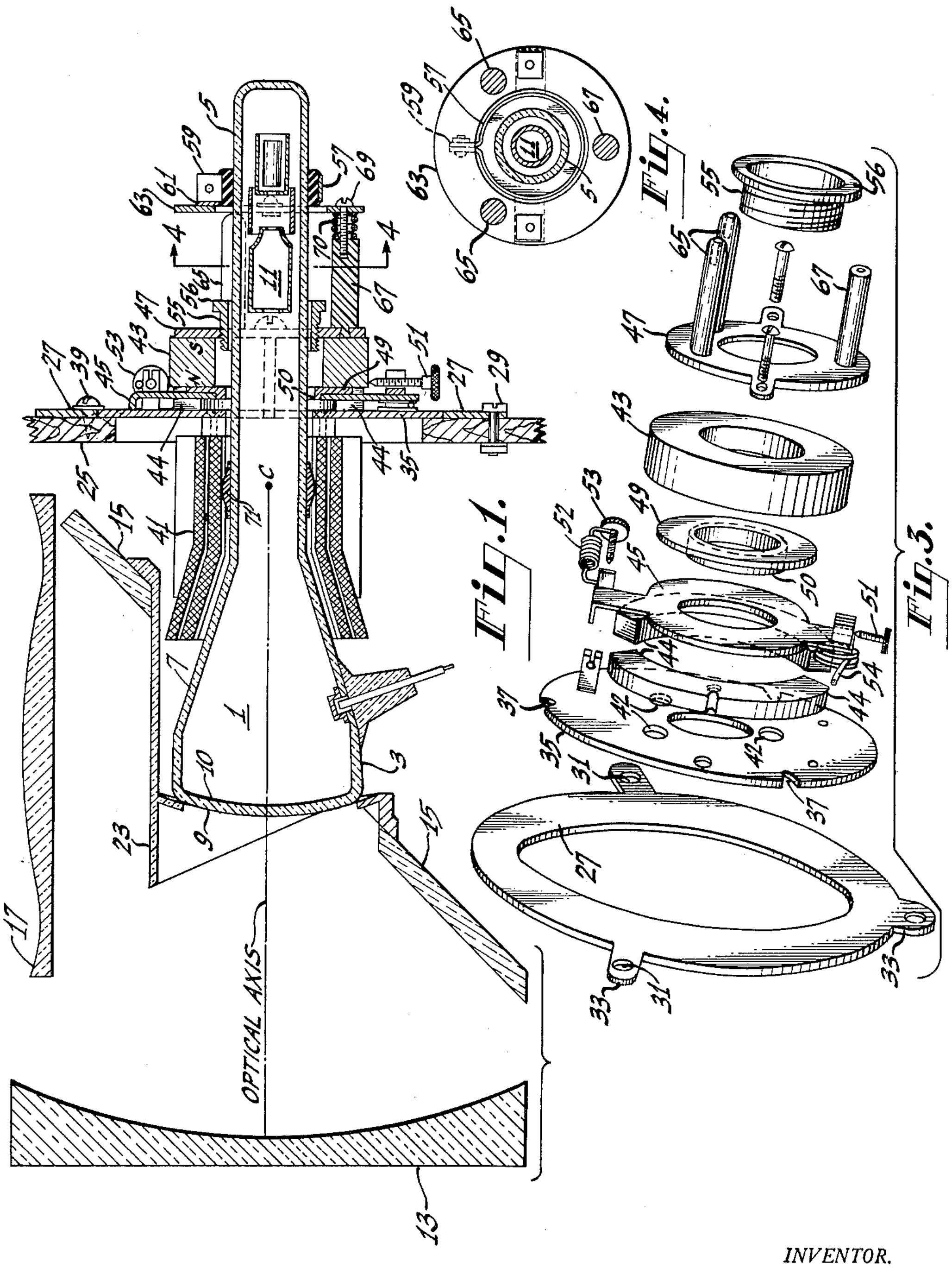
FIGURE 1 is a sectional view of a cathode ray tube and its related optical lenses, according to the invention.
FIGURE 3 is a disassociated view of accessory apparatus utilized in conjunction with the cathode ray tube in accordance with the invention.
FIGURE 4 is a view of a cross-section taken on the line 4—4 of the apparatus shown in FIGURE 1.

In FIGURE 1, an electronic image projection tube 1 comprises a glass envelope 3 which is formed with a cylindrical neck portion 5 and a substantially frusto-conical portion 7 that is closed at its end by a faceplate 9 having a spherical curvature. On the inner surface of the faceplate 9, a phosphor coating or luminescent screen 10 is formed having substantially the same configuration as the faceplate 9. The center of curvature C of the luminescent screen 10, which may be determined by optical calculations, is located within the cylindrical neck portion 5 of the tube 1. An electron gun assembly 11 is disposed within the neck portion of the envelope 3 for producing an electron beam which impinges on the image reproducing screen 10 during tube operation.

Figures 2, 5, 6:
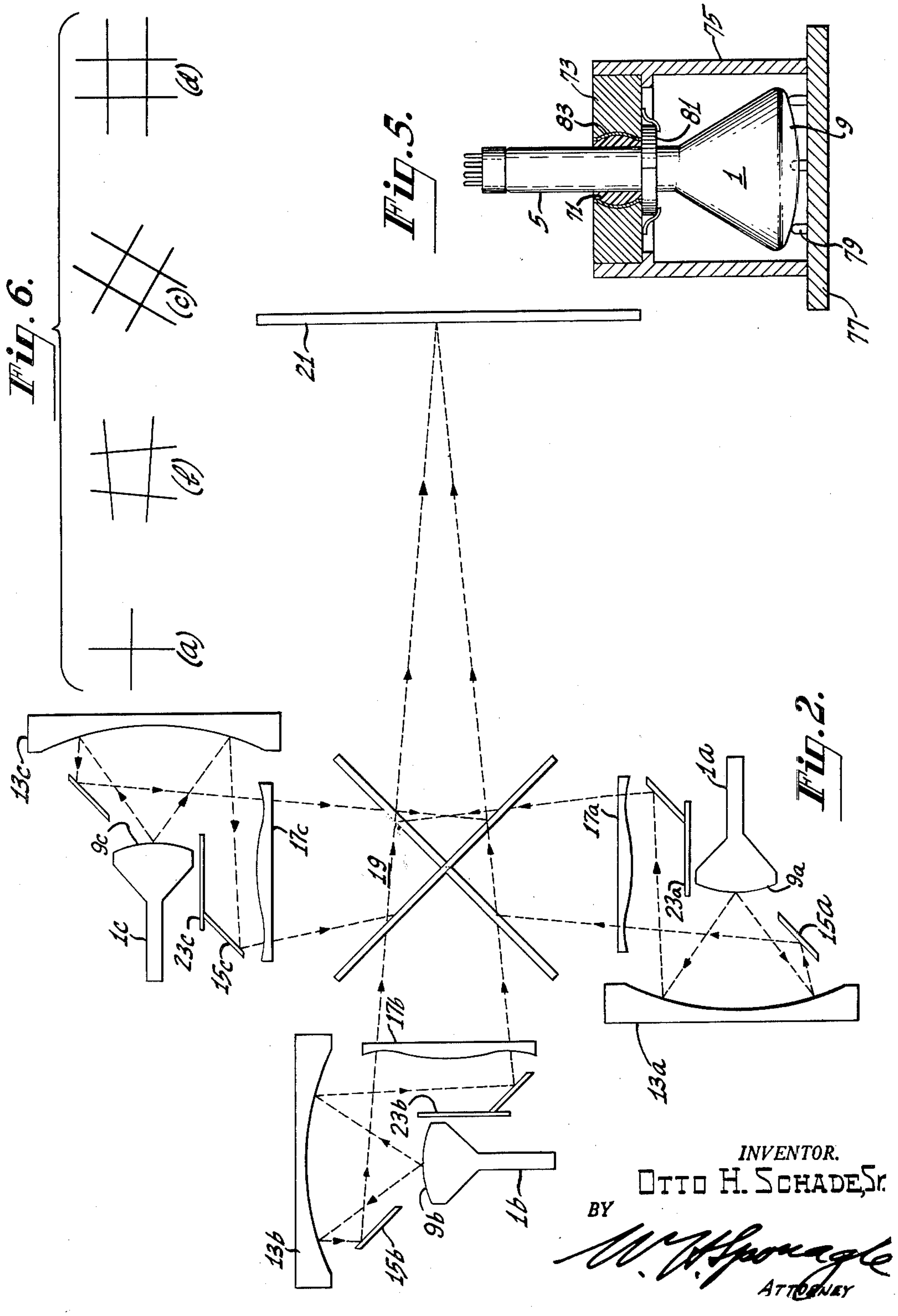
FIGURE 2 illustrates an image projection system comprising three projection tubes and an associated optical lens system.
FIGURE 5 is an exploded view of a device employed for joining a ball-shaped sleeve to the cathode ray tube.
FIGURE 6 is a series of test images referred to in the description of the adjustment of the apparatus.

In FIGURE 2, one arrangement of a tricolor optical image projection system is shown for the purpose of illustrating the optical relationships comprising three cathode ray projection tubes 1_a, b, c_ and associated reflecting lenses or mirrors, corrector transmitting plates, and dichroic lens assembly. It is to be understood that other known configurations embodying similar equipment may be used instead of the one represented in FIGURE 2. The principal reflecting lens 13_a, b, c_ for each tube is a spherical type mirror which is spaced from the faceplate 9_a, b, c_ of the tube, and has a substantially similar curvature to that of the faceplate 9 and screen 10. The conformation of the principal reflecting lens 13 determines the optical axis of its corresponding tube.

Each tube has an additional reflecting mirror 15_a, b, c_ disposed at about a 45° angle with respect to the axis of the tube for directing the reflected beam towards a corrector transmitting lens 17_a, b, c_ disposed adjacent each tube. Crossed dichroic mirrors 19 are placed in a predetermined relationship with respect to the transmitting lenses 17_a, b, c_ to reflect and superimpose the image components received from each tube onto a viewing screen 21 in colors related to the information impressed on each tube. The broken lines indicate the paths of typical light rays from the cathode ray tubes 1*a*, *b*, *c* to the viewing screen 21. To prevent any random dispersion of light which may appear through surfaces of the glass envelope 3 other than the light reflected from the lenses 13, an opaque shield 23*a*, *b*, *c* is positioned between the frusto-conical portion 7 of the tube and the corrector transmitting lens 17. The purpose of this lens is to correct for any spherical aberration produced by the spherical reflector 13 as taught, for example, in Patent 2,273,801, granted February 17, 1942, to Daniel O. Landis.

Since the invention is applicable similarly to each cathode ray tube of an image projection system in which accurate image registry is required, the description will exemplify a single projection tube without its circuit connections, by way of example.

Reference is made again to FIGURE 1. In order to mount the tube 1 and its accessory apparatus, a tube mounting 25 which may be in the form of a circular metal frame is fixed at a predetermined distance from the principal reflecting lens 13 so that the mounting 25 and the reflecting lens 13 are substantially parallel and coaxially positioned, as represented in FIGURE 1.

An annular wobble plate or support plate 27, illustrated in FIGURE 3, is mounted to the frame 25 by three thin shaft screws 29 fastened through large clearance holes 31 in three spaced ears 33 formed at the periphery of the plate 27. Large spring washers (not shown) are provided between the screw heads 29 and the support plate ears 33. The support plate 27 is used for displacing the tube 1 transversely relative to the optical axis to coaxially align the deflection yoke axis with the optical axis of the tube.

An annular yoke plate 35 having three notches 37 spaced 120 degrees apart at its periphery is fastened to the support plate 27 and to the tube mounting 25 by three screws 39 and washers. The yoke plate 35 fits closely within the support plate 27 and is rotatable therein. It is inserted by first lining up the notches 37 with the screws 39 and washers and then rotating plate 35. The mounting frame 25, support plate 27 and yoke plate 35 are non-magnetic and of rigid construction.

On the side of the yoke plate 35 facing the reflecting lens or mirror 13, a deflection yoke 41 is mounted orthogonally so that the yoke axis is coincident with the center of plate 35. The yoke 41 is supported by means of extending screws retained within three countersunk holes 42 formed in the yoke plate 35. In the final assembly, the deflection yoke 41 is spaced from and surrounds that portion of the tube which encompasses the center of curvature C of the tube faceplate. By rotating the yoke plate 35 against the inner periphery of the annular support plate 27, the deflection yoke 41 and the tube 1 are also rotated about the optical axis.

On the other side of the yoke plate 35, an annular permanent magnet 43 is retained between two non-magnetic ring-like members, designated as magnet spacers 44 being the members adjacent to the yoke plate 35. An annular front pole piece 49 having a cylindrical portion 50 is positioned between the magnet 43 and the front pole piece guide 45 so that the aperture of guide 45 snugly receives the portion 50. The apposition of the front pole piece 49 and the magnet 43 is controllable by means of horizontal and vertical registry thumb screws 51 and 53 respectively. These adjusting registry screws are used for shifting the center of the magnetic lens field in mutually perpendicular directions corresponding to a horizontal and vertical direction in the projected image, by displacement of the pole piece 49 with relation to the magnet 43 and thus provide a control to center the electron beam (and have the scanning raster) on the optical axis. Each of the adjusting screws 51 and 53 is provided with a spring 52 and 54 respectively, which may be helical or of the piano wire type, to prevent backlash effect during adjustment.

In addition to the front pole piece 49, a rear pole piece 55 is provided for joinder with the rear pole piece guide 47. The inner periphery of the rear pole piece guide 47 is threaded to receive the rear pole piece 55 which has an annular part 56 with reciprocating threads for engagement with the rear guide 47. The rear pole piece 55 has a knurled portion 56 which may be grasped for rotating the pole piece 55 within the guide 47. This rotation provides for variation of the magnetic field strength between the pole pieces 49 and 55 and thereby serves as a beam focusing control to derive a sharp picture. At the outer periphery of the guide 47 are two apertured ears to accept screws for clamping the magnet 43 to the yoke plate 35, from which it is spaced by spacers 44.

Spaced from the rear pole piece guide 47 towards the electron gun portion 11 of the tube, a neck clamp 57 is provided for holding the tube, as illustrated in FIGURES 1 and 4. The inner face of the clamp 57 is felt lined, and the clamp may be closed or opened by means of a screw and nut which links two protruding lips 59 formed at a disjunction of the clamp. The clamp 57 has two mounting tabs 61 with tapped holes for receiving screws so that the clamp can be mounted on an annular support ring 63. The support ring 63 in turn is joined with two hinge posts 65 which are secured by riveting or threading to the rear pole piece guide 47. The hinge posts 65 have tapered edges disposed in two apertures of the support ring 63, thus providing a ball and socket type joint which allows the swiveling of the support ring 63 on the hinge posts 65.

In addition to the two hinge posts 65, a shorter post 67 is secured to the rear pole piece guide 47. This short post 67 receives an optical focus vernier adjusting screw 69 which has a screw head that bears against the neck clamp support ring 63. Turning the vernier screw 69 makes the support ring 63 tilt, causing the neck clamp 57 to be displaced which results in an axial displacement of the tube for fine optical focusing action. Surrounding the threaded portion of the optical focuse vernier screw 69, and between the support ring 63 and the short post 67, there is a helical spring 70 which prevents a backlash effect when the vernier screw 69 is used for focusing.

Generally, the glass envelope of a projection tube is not perfectly concentric with respect to the principal axis of the tube. According to this invention, in order to compensate for the eccentricity of the glass tube neck 5, each projection tube of a television receiver projection system is provided with a ball shaped sleeve 71 which is mounted around the neck 5 of the tube so that the sleeve surrounds the center of curvature C that is determined by the spherical type tube faceplate. The spherical shaped sleeve 71 is formed preferably from a plastic material, which may be self-setting epoxy resin, to provide a substantially concentric outer surface located about the center of curvature. The center of curvature of the sphere defined by the sleeve 71 is coincident with the center of curvature C of the tube's phosphor screen 10. When the projection tube and its attached plastic sleeve is inserted within the cavity of the deflection yoke 41 so that the spherical sleeve is pivotally positioned against the yoke, the tube may be adjusted axially with respect to the deflection yoke, or may be pivoted about the center of curvature C of the screen 10.

To mount a spherical type sleeve onto the cylindrical neck of a cathode ray tube so that the center of curvature of the sleeve coincides with the center of curvature C of the tube screen, a spherometer device such as shown in FIGURE 5 is employed. The spherometer assembly comprises a split cylindrical retaining member 73 which is fixed at one end of a cylindrical section 75 that is supported on a base plate 77 at the other end. The base plate 77 has three vertically disposed pins 79 of equal height on its face which are equally spaced 120° apart defining a circle.

An iris or a circular split chuck 81, formed from a suitable material, is coaxially aligned below the retaining member 73 and firmly retained against the lower surface thereof. The center of the circle defined by the pins 79 on the base plate 77 lies on the axis passing through the retaining member 73 and the split chuck 81.

The cathode ray tube 1 is inserted within the retaining member 73 when the iris 81 is removed and set down so that the faceplate 9 rests on the pins 79. The iris 81, which has an inner diameter when closed that provides a close fit with the tube neck, is then reinserted and tightened around the neck of tube 1, to close up the lower opening of the member 73. Note that the iris 81 must be permitted to slide with respect to the axis of the fixture, because the tube neck may not be concentric with the fixture axis. The height of the pins 79 and the spacing of the retaining member 73 from the pins are such that the center of curvature C of the tube screen 10 is made to coincide with the center of curvature of the annular retaining member 73.

With the tube firmly positioned on the pins 79, the liquid plastic material is introduced into a ball shaped mold 83 that is securely held in a conforming recess in the center of the retaining member 73. The plastic is mixed with a catalyst and allowed to solidify and thus adheres to the neck of the tube forming a ball shaped sleeve 71 which in conjunction with the fixed deflection yoke 41 affords pivotal means for tilting the tube around its center of curvature C.

For proper optical adjustment of the yoke assembly and the focusing lens assembly, the projection tube is moved axially by means of the optical focus vernier screw 69, and for proper beam focus the rear pole piece 55 is adjusted so that the image display on the viewing screen 21 presents a sharply focused picture. When a sharp picture has been attained, the tube is then moved gradually in an axial direction until a test image, such as a plus sign (+) shown in FIGURE 6*a* formed by very fine long lines is split to give two pairs of lines which are out of focus, as shown in FIGURE 6*b*. If the lines of each pair are not in parallel relationship, the screws 29 holding the support plate 27 are loosened, and the support plate 27 is jiggled together with the tube transversely relative to the optical axis until the lines of each pair are parallel (FIGURE 6*c*). When parallel line images are displayed, the support plate 17 is permanently fastened to the housing 25, and no further adjustment of the support plate 27 is necessary during manufacturing assembly or when a tube replacement is required in the receiver.

If the image on the target screen 21 is at an angle to the horizontal or vertical sides of the screen 21 as illustrated in FIGURE 6*c*, then the three screws 39 and washers which hold the yoke plate 35 fixed relative to the support plate 27 are loosened, and the yoke plate 35 is rotated together with the deflection yoke 41 and the projection tube until the desired alignment is reached (FIGURE 6*d*). The yoke plate 35 is then clamped by the three screws 39 and washers within the annulus of the support plate 27.

If the image display is not centered on the target screen 21, the front pole piece 49 is adjusted by means of the horizontal registry screw 51 and the vertical registry screw 53 thus shifting the center of the magnetic lens field provided by the focusing magnet 43 and the position of the scanning raster. Adjustment of the rear pole piece 55 provides electron beam focusing means.

Some tubes have electron guns which may be out of alignment with respect to the tube neck thereby causing a blurred picture at one side of the target screen 21. In accordance with this invention, the tube 1 is pivoted or tilted about the center of curvature C of its screen 10 to align the electron beam so that it is projected axially through the center of the magnetic focusing lens and through the center of curvature C of the tube screen on the deflection yoke axis prior to deflection. Thus, the fourth requirement mentioned heretofore is satisfied.

To achieve this condition, the neck clamp 57 is loosened and the tube is manipulated so that it is tilted on the sleeve 71 around the center of curvature therein. When the electron gun 11 is aligned so that the electron beam progresses axially as required, the image provided at the target screen 21 will be sharply focused, properly aligned and centered.

It is noted that the tilting action does not affect the support plate 27, the yoke plate 35, the magnetic focusing lens comprising the magnet 43 and pole pieces 49 and 55, or the deflection yoke 41. Therefore, of the previous adjustments that were made, only the centering of the image has to be corrected.

When the tube 1 needs to be replaced, the neck clamp 57 is loosened and the tube is removed with its ball shaped sleeve 71. A new tube having its own sleeve is inserted in lieu thereof. The support plate, yoke plate, the deflection yoke attached to the yoke plate, and the permanent magnet remain fixed in position with respect to the optical axis determined by the principal reflecting lens. All the necessary adjustments for focusing and alignment may be made simply and conveniently by means of the front pole piece registry screws, the rear pole piece, the optical focus vernier screw, and by pivoting the tube while the neck clamp is loose in accordance with the invention.

What is claimed is:

1. An image projection tube assembly comprising a cathode ray tube having a spherical tube lens faceplate and a phosphor screen thereon and a cylindrical neck such that the center of curvature of said screen is located within said neck, a ball shaped plastic sleeve attached to and surrounding said neck so that the center of said sleeve coincides with said center of curvature, and a deflection yoke fixed with relation to said tube so that the yoke axis passes through said center of curvature, said yoke having an inner cylindrical wall concentrically contacting and encircling said sleeve thereby providing pivotal means for tilting said tube.

2. An image projection assembly comprising a cathode ray tube having a spherical type image reproducing screen, a reflecting lens spaced from said screen and having an optical center and a curvature which are determinative of an optical axis, a deflection yoke fixed in coaxial relation with said optical axis, a magnetic focusing lens assembly coaxially aligned with said optical axis, means for adjusting said focusing lens, a ball shaped nonmagnetic sleeve joined to said tube and supported by said deflection yoke so as to be encompassed by said yoke, said sleeve having a center of curvature located within said tube which coincides with the center of curvature of said screen, said deflection yoke and said sleeve providing pivotal means for tilting said tube about said centers, and means to fix said tube in position with respect to said reflecting lens after said tube has been tilted and aligned.

3. An image projection assembly having a fixed optical axis comprising a projection tube having a spherical image reproducing screen, the center of curvature of said screen lying on said optical axis, a deflection yoke closely spaced from and disposed around said tube so that the axis of said yoke coincides with said optical axis, and a spherical type shaped sleeve joined to said tube and pivotally positioned against and within said deflection yoke so that the center of curvature of said sleeve coincides with the center of curvature of said screen whereby said tube may be tilted about said centers of curvature such that said yoke axis remains on said optical axis during said tilting.

4. A projection assembly comprising a cathode ray tube having a spherical type luminescent phosphor screen, said tube having an electron gun assembly for producing an electron beam, a deflection yoke surrounding a portion of said tube for deflecting said beam, focusing means coupled to said tube for focusing said beam, support means for said yoke and said focusing means, said support means being adjustable thereby providing alignment and focusing of the electron beam, and pivotal means supported by said yoke and disposed between said tube and said yoke and fixed to said tube around the center of curvature of said screen so that said tube may be tilted around said center of curvature.

5. An image projection assembly comprising a cathode ray tube having a spherical type image reproducing screen with a center of curvature located within said tube, an electron gun assembly spaced from said screen for producing an electron beam directed towards said screen, an electromagnetic lens surrounding a portion of said tube for focusing said beam, a deflection yoke spaced from and surrounding another portion of said tube for deflecting said beam, a spherical type sleeve mounted on said tube and supported by and between said yoke and said tube so that the center of said sleeve coincides with the center of curvature of said screen, and means for securely fastening said yoke in a fixed position so that said tube and said sleeve may be tilted with relation to said yoke about said center of curvature for alignment of said tube.

6, An image projection tube assembly comprising a cathode ray tube positioned axially with respect to an optical axis and having a spherical type image reproducing screen with a center of curvature located on said axis, a support plate coupled to said tube for transversely displacing said tube relative to said axis to provide proper registration of an image, a rotatable yoke plate coupled to said tube for rotating said tube about said axis to provide horizontal and vertical scan alignment of the image, a cathode ray deflection yoke attached to said yoke plate, an adjustable magnetic focusing lens encompassing said tube for focusing the image, and pivotal tube support means supported by and within said yoke concentrically positioned about said center of curvature so that said tube may be tilted with said pivotal means about said center of curvature for alignment of said tube.

References Cited in the file of this patent

UNITED STATES PATENTS

| | | |
|---|---|---|
| 2,517,774 | Epstein | Aug. 8, 1950 |
| 2,627,066 | Blaker et al. | Jan. 27, 1953 |

FOREIGN PATENTS

| | | |
|---|---|---|
| 777,084 | Great Britain | June 19, 1957 |